United States Patent
Bloemendaal (10) Patent No.: US 9,889,583 B2
(45) Date of Patent: Feb. 13, 2018

(54) GRAIN BIN SENSOR CABLE FORMING APPARATUS

(71) Applicant: CTB, Inc., Milford, IN (US)

(72) Inventor: Brent J. Bloemendaal, Zionsville, IN (US)

(73) Assignee: CTB, Inc., Milford, IN (US)

( * ) Notice: Subject to any disclaimer, the term of this patent is extended or adjusted under 35 U.S.C. 154(b) by 184 days.

(21) Appl. No.: 14/990,486

(22) Filed: Jan. 7, 2016

(65) Prior Publication Data

US 2016/0114504 A1 Apr. 28, 2016

Related U.S. Application Data

(62) Division of application No. 13/791,917, filed on Mar. 9, 2013, now Pat. No. 9,409,327.

(51) Int. Cl.
| | |
|---|---|
| *B29C 43/18* | (2006.01) |
| *B29C 43/52* | (2006.01) |
| *B29C 43/02* | (2006.01) |
| *B29C 43/36* | (2006.01) |
| *B29L 31/00* | (2006.01) |

(Continued)

(52) U.S. Cl.
CPC ............ *B29C 43/52* (2013.01); *B29C 43/02* (2013.01); *B29C 43/18* (2013.01); *B29C 43/36* (2013.01); *B29K 2023/0633* (2013.01); *B29L 2031/34* (2013.01); *B29L 2031/3462* (2013.01);

(Continued)

(58) Field of Classification Search
CPC ............ B29C 2043/026; B29C 43/183; B29C 43/184
See application file for complete search history.

(56) References Cited

U.S. PATENT DOCUMENTS 2,655,734 A * 10/1953 Ohlheiser ............ G01N 27/048
34/174
2,792,481 A 5/1957 Wood
(Continued)

FOREIGN PATENT DOCUMENTS

| CN | 1278669 A | 1/2001 |
|---|---|---|
| EP | 2535902 | 12/2012 |

(Continued)

OTHER PUBLICATIONS

"Resistance to Airflow of Grains, Seeds, Other Agricultural Products, and Perforated Metal Sheets"; pp. 528-538; Mar. 1996; ASAE Standards 1998.

(Continued)

*Primary Examiner* — Robert B Davis
(74) *Attorney, Agent, or Firm* — Harness Dickey (57) ABSTRACT

A method and apparatus for forming a grain bin sensor cable including a plurality of mold members defining a mold cavity. A pre-formed cable with wires disposed therein is placed into the mold cavity, heated, and formed into a post-formed cable. The post-formed cable includes a recessed portion and a pair of end caps. Apertures are created within the recessed portion so as to expose a portion of the wires. The end caps are generally cone-shaped and include vertical walls. The post-formed cable is removed from the mold cavity and a sensor package is coupled to the wires exposed in the recessed portion and captured between the vertical walls of the end caps. A housing is coupled about the sensor package.

16 Claims, 4 Drawing Sheets

(51) Int. Cl.
B29L 31/34 (2006.01)
B29K 23/00 (2006.01)

(52) U.S. Cl.
CPC ...... *B29L 2031/707* (2013.01); *Y10T 29/4998* (2015.01); *Y10T 29/49778* (2015.01)

(56) References Cited

U.S. PATENT DOCUMENTS

| | | | |
|---|---|---|---|
| 3,026,569 A | | 3/1962 | Keller |
| 3,163,703 A | | 12/1964 | McLoad |
| 3,649,434 A | * | 3/1972 | Mortenson ............ B29C 43/224 156/176 |
| 4,037,527 A | | 7/1977 | Steffen |
| 4,145,176 A | | 3/1979 | Nelson |
| 4,133,622 A | | 9/1979 | Braun |
| 4,281,489 A | | 8/1981 | Kallestad et al. |
| 4,306,490 A | | 12/1981 | Kallestad et al. |
| 4,316,870 A | | 2/1982 | Rowley |
| 4,378,323 A | * | 3/1983 | Brandeau ................ B29C 65/70 156/273.9 |
| 4,383,966 A | | 5/1983 | Svetlik |
| 4,522,335 A | | 6/1985 | Kallestad et al. |
| 4,688,332 A | | 8/1987 | Kallestad et al. |
| 4,930,229 A | | 6/1990 | Moser |
| 5,714,738 A | * | 2/1998 | Hauschulz ............ F16L 53/005 138/33 |
| 5,893,218 A | | 4/1999 | Hunter et al. |
| 6,530,160 B1 | | 3/2003 | Gookins |
| 7,004,401 B2 | | 2/2006 | Kallestad |
| 7,240,029 B2 | | 7/2007 | Kallestad |
| 7,243,857 B2 | | 7/2007 | Kallestad |
| 7,472,070 B2 | | 12/2008 | Kallestad |
| 2003/0079365 A1 | | 5/2003 | Corak et al. |
| 2003/0214310 A1 | | 11/2003 | McIntosh |
| 2006/0100745 A1 | | 5/2006 | Kallestad |
| 2006/0108434 A1 | | 5/2006 | Kallestad |
| 2009/0211110 A1 | | 8/2009 | Bartol |
| 2009/0262781 A1 | | 10/2009 | Shumaker |
| 2014/0043048 A1 | | 2/2014 | Bloemendaal et al. |
| 2014/0046111 A1 | | 2/2014 | Yang et al. |

FOREIGN PATENT DOCUMENTS

| | | | | |
|---|---|---|---|---|
| GB | 2150487 A | * | 7/1985 | ......... B29C 37/0082 |
| JP | S59148624 A | | 8/1984 | |
| UA | 6252 U | | 4/2005 | |
| UA | 98043 C2 | | 4/2012 | |
| WO | WO9967078 A1 | | 12/1999 | |
| WO | WO2011033539 | | 3/2011 | |

OTHER PUBLICATIONS

Paul Sumner; "Harvesting and Drying Corn"; A Guide to Corn Production in Georgia, University of Georgia, 2013, pp. 76-86 (http://www.uaex.edu/publications/PDF/MP297/9_storage.pdf).

Dennis R. Gardisser; "9—On Farm Storage and Drying"; Grain Sorghum Production Handbook, University of Arkansas, Current, pp. 55-60 (http://search.uaex.edu/search?q=on+farm+storage+and+drying&site=default_collection&client=uaex&proxystylesheet=uaex).

"Management of Stored Grain With Aeration—Airflow and Equipment"; Revised 1991.

S.J. Ray, L.O. Pordesimo, LR. Wilhelm; "Airflow Resistance of Some Pelleted Feed"; vol. 47(2): pp. 513-519; "Transactions of the ASAE"; © 2004 American Society of Agricultural Engineers ISSN 0001-2351.

S.O. Jekayinfa; "Effect of Airflow Rate, Moisture Content and Pressure Drop on the Airflow Resistance of Locust Bean Seed"; May 2006; Agricultural Engineering International; the CIGR Ejournal. Manuscript FP 06 010. vol. VIII.

D. Garg, D.E. Maier; "Modeling non-uniform airflow distribution in large grain silos using Fluent", pp. 754-762; $9^{th}$ International Working Conference on Stored Product Protection, Oct. 15-18, 2006, Sao Paulo, Brazil (http:spiru.cgahr.ksu.edu/proj/iwcspp9.html).

"DS36C280 Slew Rate Controlled CMOS EIA-RS-485 Transceiver"; © 2004 National Semiconductor Corporation; Texas Instruments; Literature No. SNLS097B; Jul. 2000.

BinManager LIT; GSI Total Value, Total Systems; GS-040 Oct. 2009; © 2009 by GSI Group, LLC.

"Introducing OPI-Integris moisture", Jul. 1, 2011 (Jul. 1, 2011), XP055082579 (whole document) URL:http://www.grainsystems.ca/documents/moisture_cable.pdf.

OPI Moisture Management; "Moisture Monitoring & Control"; OPI Systems; Integris USA LLC (unknown original publication date, but downloaded from the internet prior to Aug. 8, 2012).

"Complete Grain Management with BinManager"; IntelliAir, BinManager, (unknown original publication date, but downloaded from the internet prior to Aug. 8, 2012).

"Grain Moisture Measurement with Capacitance Type Devices"; AgriChem, Inc.; Oct. 21, 1994.

R.B. McIntosh, M.E. Casada; "Fringing Field Capacitance Sensor for Measuring the Moisture Content of Agricultural Commodities"; IEEE Sensors Journal, vol. 8, No. 3, Mar. 2008.

M.E. Casada, P.R. Armstrong; "Wheat Moisture Measurement with a Fringing field Capacitive Sensor"; vol. 52(5): 1785-1791; © 2009 American Society of Agricultural and Biological Engineers ISSN 0001-2351.

M.E. Casada, P.A. Armstrong; "Wheat Moisture Measurement with a Fringing Field Capacitive Sensor"; An ASABE Meeting Presentation; Paper No. 085207; Jun. 29, 2008.

W.C. Wang, Y.Z. Dai; "A Grain Moisture Detecting System Based on Capacitive Sensor"; International Journal of Digital Content Technology and its Applications; vol. 5, No. 3; Mar. 2011.

"PIC16F5X Data Sheet, Flash-Based, 8-Bit CMOS Microcontroller Series"; © 2004 Microchip Technology Inc.; DS41213C—p. ii-88; Sep. 27, 2004.

European Search Report dated May 19, 2014 in related Application No. EP 14 15 7995.

Official Action dated Jun. 26, 2015 in corresponding Russian Patent Application No. 2014107971, with English translation.

English translation of the Office Action dated Sep. 28, 2017 in corresponding Ukrainian Patent Application No. a201402334.

* cited by examiner

GRAIN BIN SENSOR CABLE FORMING APPARATUS

CROSS-REFERENCE TO RELATED APPLICATIONS

This application is a divisional based upon and claims the benefit of priority from the prior U.S. patent application Ser. No. 13/791,917, filed on Mar. 9, 2013 and now U.S. Pat. No. 9,409,327; the entire contents of which are incorporated herein by reference.

FIELD

The present disclosure relates to grain bin cables, and more particularly to methods and apparatus to form such cables.

BACKGROUND

This section provides background information related to the present disclosure which is not necessarily prior art.

It is well known that farmers engaged in the cultivation of grain crops make use of grain bins to store harvested grain in bulk for periods of time. It is desirable for the grain to be stored in such a manner so as to prevent it from spoiling. Various factors, including excessive moisture inside the grain bin, can contribute to grain spoilage. As such, it is desirable to monitor various parameters, including moisture content, inside the grain bin.

Various methods for monitoring parameters inside grain bins are known. For example, one method involves coupling a plurality of sensors to a plurality of cables and suspending the cables from the roof structure of a grain bin, thereby disposing the sensor cables within the grain stored inside. The sensors are capable of monitoring grain bin parameters at various height and perimeter locations throughout the grain bin. The sensors can then communicate the sensed data to an external controller or reading device.

While loading grain into a grain bin, storing grain inside a grain bin, and/or unloading grain from a grain bin, grain can exert substantial downward forces onto the sensor cables disposed therein, particularly on the sensors mounted to the cables. Such downward forces can damage, displace, and/or shear the sensors off of the cables. As such, costly repairs to the sensors and cables can be required and inaccurate data from damaged sensors can be transmitted to the external controller or reading device.

SUMMARY

This section provides a general summary of the disclosure, and is not a comprehensive disclosure of its full scope or all of its features.

In one aspect of the disclosure, a grain bin sensor cable forming method is provided that includes positioning a pre-formed cable having a pair of wires encased within an outer sheath of a plastic material within a mold cavity having an end cap cavity, heating the outer sheath of the pre-formed cable, compressing the mold cavity around the heated outer sheath causing a volume of the plastic material to be displaced into the end cap cavity to provide a post-formed cable.

In another aspect of the present disclosure, a grain bin sensor cable forming method is provided. The method includes positioning a pre-formed cable having a pair of power wires and a pair of signal wires encased within an outer sheath of a plastic material within a mold cavity having a pair of end cap cavities, heating the outer sheath of the pre-formed cable, compressing the mold cavity around the heated outer sheath causing a volume of the plastic material to be displaced into the pair of end cap cavities to provide a post-formed cable.

In yet another aspect of the present disclosure, a grain bin sensor cable forming apparatus is provided that includes a plurality of mold members defining a mold cavity. The mold cavity includes an elongated cavity designed to accept a pre-formed length of cable and an end cap cavity. The plurality of mold members have a heating position and a cooling position relative to each other. A heater is coupled to one of the mold members to heat one of the mold members. A thermostat is coupled to the heater to control heating of the one of the mold members. One of the mold members is designed to heat a plastic material of an outer sheath of the pre-formed length of cable when in the heated position, and wherein the mold members are designed to displace a volume of the plastic material of the outer sheath into the end cap cavity as the mold members move from the heating position into the cooling position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figures 1, 2, 3, 4:
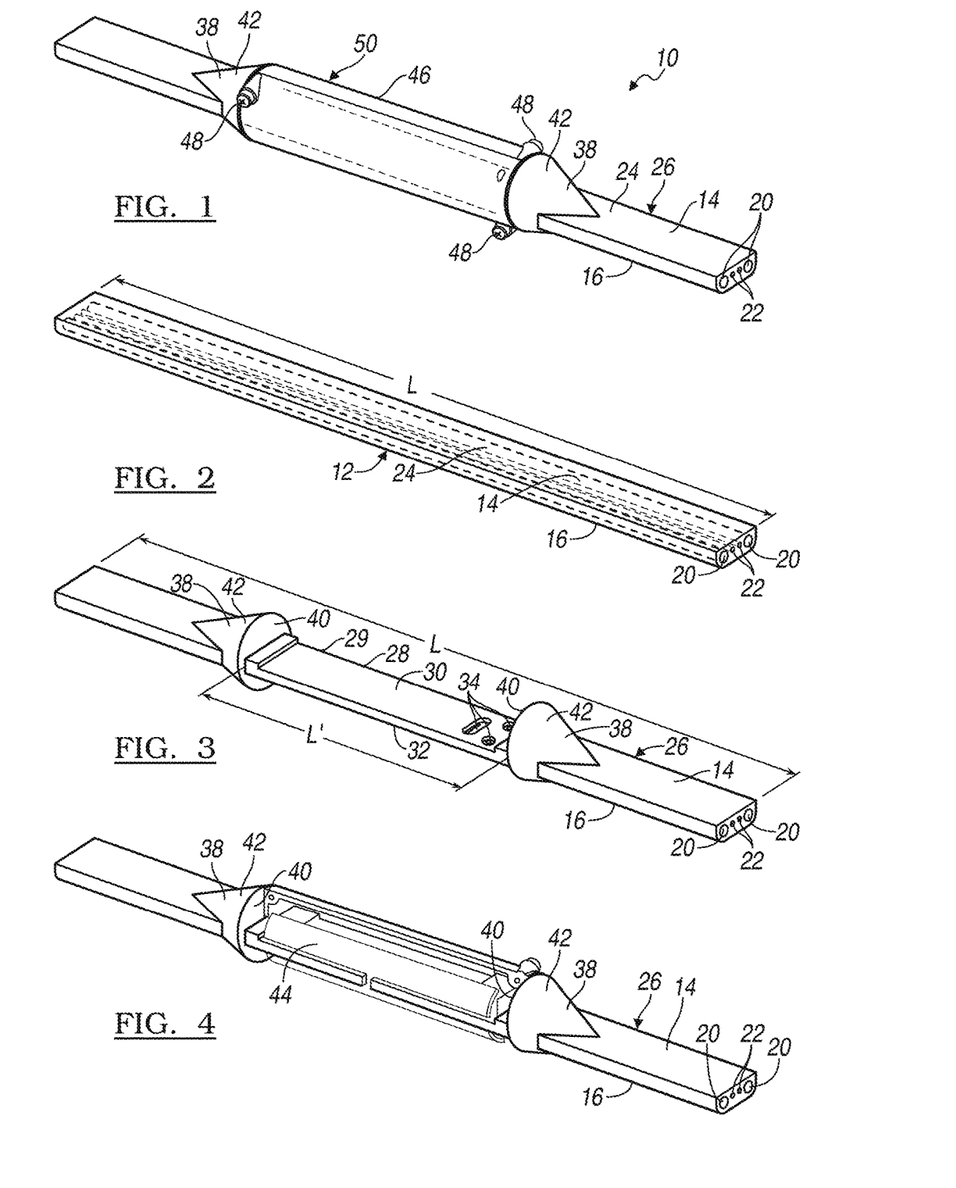
FIG. 1 is a perspective view of the grain bin sensor cable in accordance with the present disclosure.
FIG. 2 is a perspective view of the pre-formed cable.
FIG. 3 is a perspective view of the post-formed cable.
FIG. 4 is a perspective view of the post-formed cable with the sensor package coupled thereto.

With reference to FIG. 1 of the drawings, an exemplary grain bin sensor cable 10 constructed in accordance with the teachings of the present disclosure is shown. The illustrated grain bin sensor cable 10 is used for sensing the moisture content within a grain bin, however, other parameters, such as temperature, can be sensed.

The grain bin sensor cable 10 includes a sensor cable assembly 50 coupled to a post-formed cable 26, an outer sheath 24 disposed about the post-formed cable 26, and a pair of end caps 38. The end caps 38 are formed to be a single and integral part of the outer sheath 24 and can be generally symmetrical, generally cone-shaped, and are generally mirror images of one another. Each end cap 38 includes a vertical wall 40 (FIG. 3) positioned perpendicular to the outer sheath 24. Each vertical wall 40 faces the other, and captures the sensor cable assembly 50 contained therebetween, thereby reducing the chances of the sensor cable assembly 50 shearing off of the cable during grain loading, storage and/or unloading. Transitioning from each vertical wall 40, each end cap 38 includes a ramp surface 42 angling downward and away from the sensor cable assembly 50 towards the outer sheath 24 of the post-formed cable 26. The ramp surfaces 42 can reduce the downward force component exerted by the grain onto the end caps 38 and/or the sensors mounted to the cables.

The process of forming the grain bin sensor cable 10 begins with a pre-formed cable 12, shown in FIG. 2 of the drawings. The pre-formed cable 12 is generally rectangular and includes an upper surface 14, a lower surface 16 and a length L. The overall cross-sectional shape of the pre-formed cable 12 is generally rectangular and is generally consistent along the entire length L. The pre-formed cable 12 further includes a pair of power wires 20 disposed between the upper and lower surfaces 14, 16. The power wires 20 extend along the length L of the pre-formed cable 12 and can be spaced apart from one another. Positioned between the power wires 20 is a pair of signal wires 22. The outer sheath 24 is disposed about the power and signal wires 20, 22 and extends along the length L of the pre-formed cable 12. The outer sheath 24 can be comprised of a thermoplastic material, such as low-density polyethylene (LDPE). Other electrically insulating materials can also be used. The outer sheath 24 insulates the power wires 20 and the signal wires 22 from one another and also from the outside environment.

Figure 5:
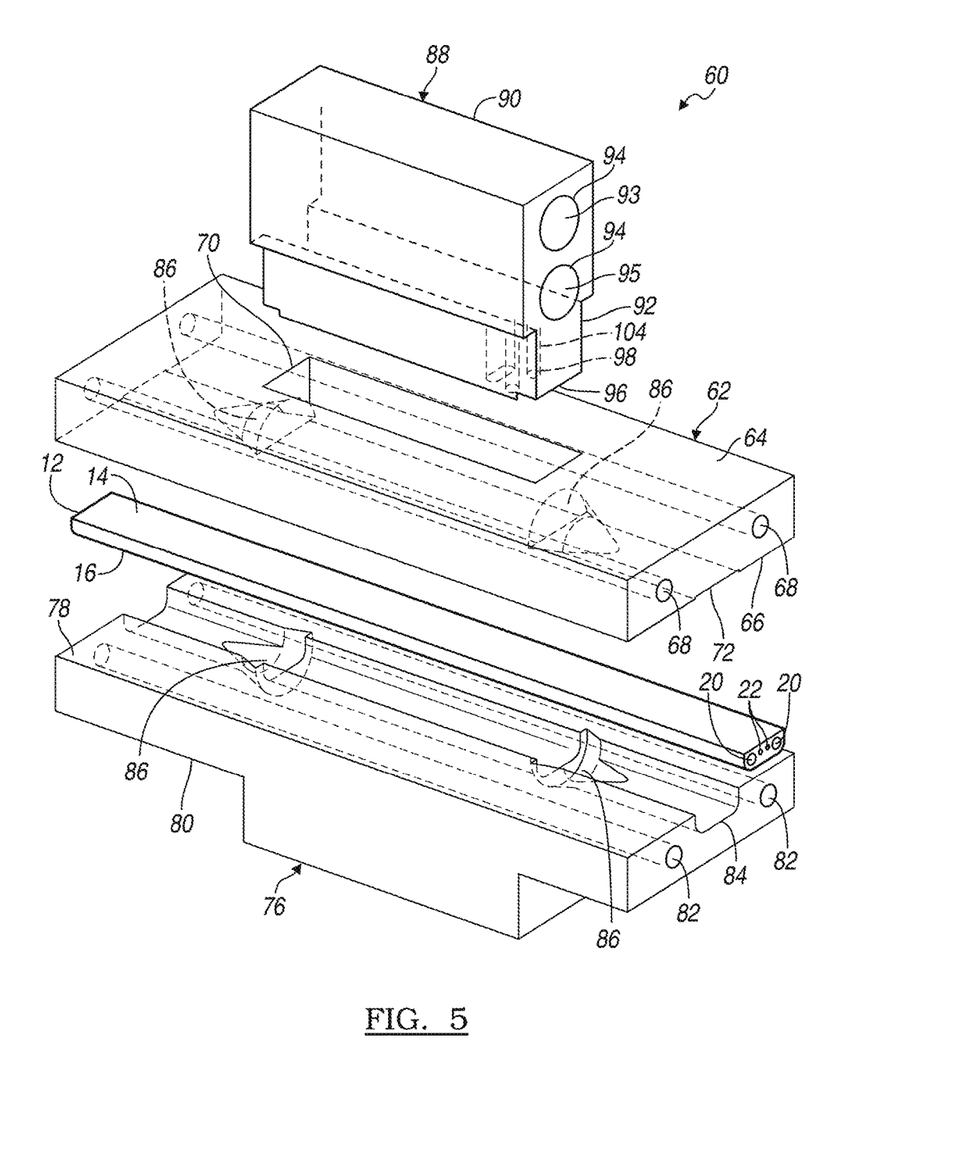
FIG. 5 is an exploded perspective view of the grain bin sensor cable forming apparatus including the pre-formed cable.

With reference to FIG. 5 of the drawings, the pre-formed cable 12 is placed into a sensor cable forming apparatus 60. The sensor cable forming apparatus 60 includes a rectangular blocked-shaped lower mold 76 with an upper and a lower surface 78, 80, and a rectangular block-shaped upper mold 62 with an upper and a lower surface 64, 66. The lower and upper molds 76, 62 can be comprised of steel, beryllium copper, aluminum or any other suitable material.

Figure 8:
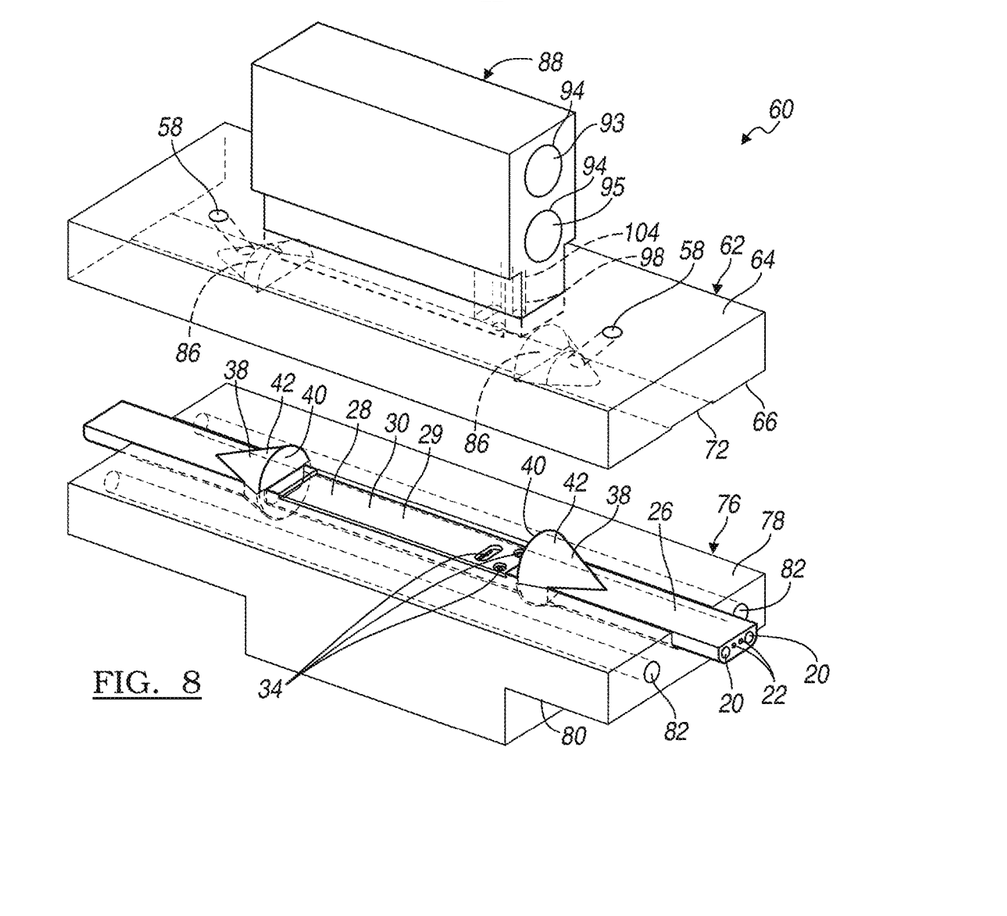
FIG. 8 is an exploded perspective view of the grain bin sensor cable forming apparatus including the post-formed cable.

Specifically, the pre-formed cable 12 is positioned within a notch channel 84 cavity located on the upper surface 78 of the lower mold 76. The notch channel 84 can be disposed along the entire length of the upper surface 78. The notch channel 84 corresponds to the lower surface 16 of the pre-formed and/or post-formed cable 12, 26. A portion of the length L of the pre-formed and/or post-formed cable 12, 26 can extend beyond the sensor cable forming apparatus 60 during operation. (See FIGS. 6A, 6B and 8). The pre-formed cable 12 may or may not be exposed to an initial heat source prior to being placed into the notch channel 84. The upper surface 78 of the lower mold 76 also includes the bottom portions of a pair of end cap cavities 86, disposed along the notch channel 84. The bottom portions of the end cap cavities 86 correspond to the end caps 38 along the lower surface 16 of the post-formed cable 26.

Figure 6A:
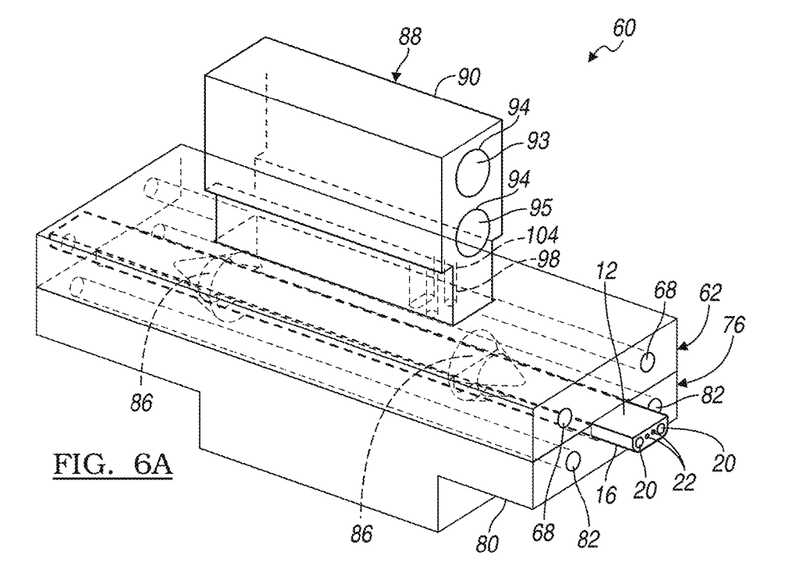
FIG. 6A is a perspective view of the grain bin sensor cable forming apparatus with the upper and lower molds in contact about the pre-formed cable with the forming apparatus not engaged in the slot.

As shown in FIG. 6A, once the pre-formed cable 12 is placed into the notch channel 84, the upper mold 62 is drawn down upon the lower mold 76 until the lower surface 66 of the upper mold 62 makes contact with the upper surface 78 of the lower mold 76.

The upper mold 62 includes a notch channel 72 cavity and the corresponding top portions of the end cap cavities 86. The notch channel 72 can be similar to the notch channel 84, and can be disposed along the entire length of the lower surface 66 of the upper mold 62. The notch channel 72 corresponds to the upper surface 14 of the pre-formed and/or post-formed cable 12, 26. The top portions of the end cap cavities 86 are disposed along the notch channel 72 and correspond to the end caps 38 along the upper surface 14 of the post-formed cable 26.

The upper mold 62 further includes a rectangular slot 70 arranged perpendicular to the upper surface 64. Specifically, the rectangular slot 70 can be aligned along the notch channel 72, between the end cap cavities 86, and can extend throughout the entire thickness of the upper mold 62.

With the upper and lower molds 62, 76 in contact, the notch channels 72, 84 fully enclose and embrace the pre-formed cable 12. The pre-formed cable 12 can be exposed to a heat source to at least partially heat and make the outer sheath 24 impressionable. Next, a rectangular forming mechanism 88 positioned above the upper mold 62 can be drawn down into the rectangular slot 70.

The forming mechanism 88 can be of a generally rectangular block shape and includes an upper portion 90 and a lower portion 92. The lower portion 92 includes a lower surface 96. The upper portion 90 is larger than the rectangular slot 70 and as such, provides a stop 79 that locates the forming mechanism 88 in a proper position relative to upper and lower molds 62, 76 during the forming process. The lower portion 92 is of an appropriate size to allow the lower portion 92 to move up and down within the rectangular slot 70 during the forming process. The lower surface 96 is of an appropriate size to fit between the end cap cavities 86 and form the recessed portion 28 of the post-formed cable 26 during the forming process.

The upper portion 90 of the forming mechanism 88 can also include a pair of passageways 94 that extend throughout the entire length of the forming mechanism 88. Similarly, the lower mold 76 and the upper mold 62 can also include a pair of temperature control passageways 82, 68. A heater 93 is positioned in at least one of the passageways 94, 82, 68, and a thermostat 95 is positioned in the other corresponding passageway 94, 82, 68. The heater 93 and the thermostat 95 can help control the temperature of the sensor cable forming apparatus 60 during operation. In this case, the heater 93 and the thermostat 95 are positioned in passageways 94 of FIG. 6A. Passageways 94, 82. 68 that do not contain the heater 93 and/or thermostat 95 can allow for the passage of a fluid, such as oil or water, to also control the temperature of the sensor cable forming apparatus 60 during operation.

Figure 6B:
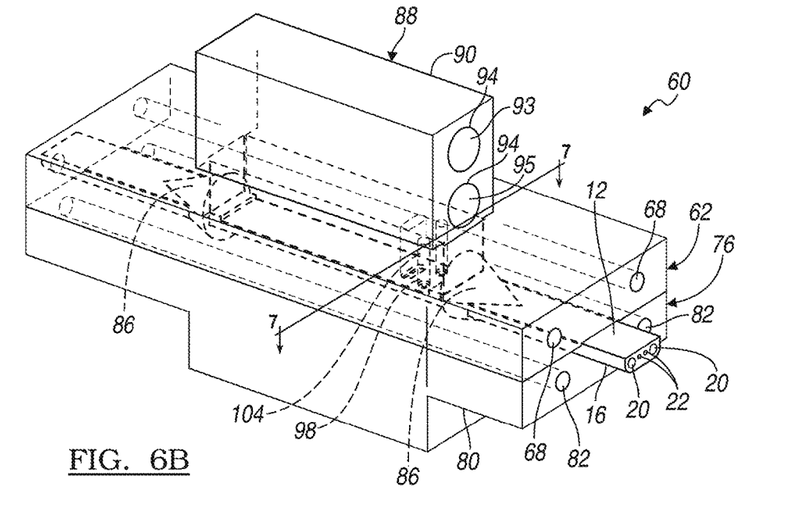
FIG. 6B is a perspective view of the grain bin sensor cable forming apparatus with the upper and lower molds in contact about the pre-formed cable with the forming apparatus engaged in the slot.
Figure 7:
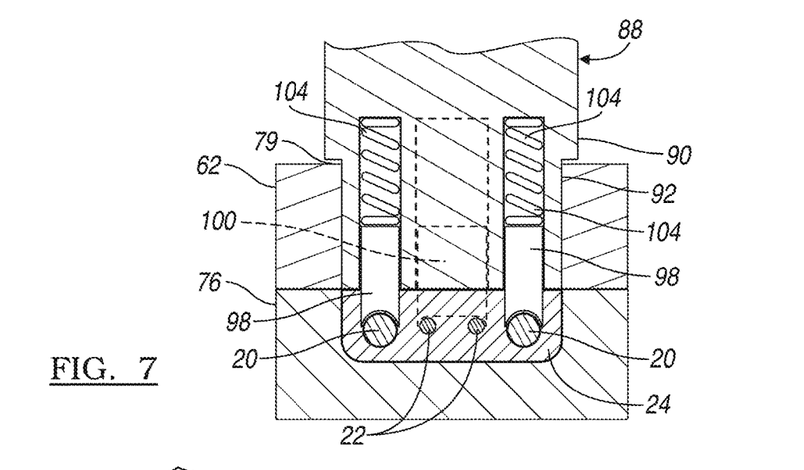
FIG. 7 is a cross-section view of the forming mechanism in contact with the pre-formed cable.

With reference to FIG. 6B and FIG. 7 of the drawings, the lower portion 92 of the forming mechanism 88 is pressed down into the rectangular slot 70 of the upper mold 62 until the lower surface 96 makes contact with the outer sheath 24 of the pre-formed cable 12. Heat can be transferred from the forming mechanism 88 to the outer sheath 24, thereby causing the outer sheath 24 to at least partially melt, becoming impressionable and pliable. The forming mechanism 88 continues to press down onto the pre-formed cable 12, displacing the outer sheath 24 material and thereby forming the recessed portion 28 of the post-formed cable 26. The volume of the outer sheath 24 material that is displaced flows into the end cap cavities 86. The volume of displaced material can be equal to the volume needed to fill both end cap cavities 86.

With continued reference to FIG. 6B and FIG. 7 of the drawings, a plurality of power wire pins 98 and signal wire pins 100 extend downwardly from the forming mechanism 88 to form a plurality of apertures 34 or depressions in the outer sheath 24. The apertures 34 provide access to the power and signal wires 20, 22 through the outer sheath 24 for assembly of the signal package 44 to the post-formed cable 26 further described below. The proximal end of each pin 98, 100 is biased by a spring 104 to a location below the lower surface 96 of the forming mechanism 88. Each pin 98, 100 can include a concave shape at the distal end, corresponding to the arc shape of the power and signal wires 98, 100.

As the forming mechanism 88 is pressed down into the outer sheath 24 forming the recessed portion 28, the forming mechanism 88 can transfer heat to the outer sheath 24. The springs 104 bias the pins 98, 100 against the outer sheath 24 until the pins 98, 100 eventually displace the outer sheath 24 material and make contact with the power and signal wires 20, 22. Once contact is made, the power and signal wires 20, 22 resist the bias of the springs 104 and prevent the pins 98, 100 from depressing into the wires 20, 22.

The outer sheath 24 material displaced by the pins 98, 100 also flows into the end cap cavities 86, and along with the displaced outer sheath 24 material from the recessed portion 28, forms the end caps 38 of the post-formed cable 26. Thus, the end caps 38 can become a single and integral part of the outer sheath 24.

An auxiliary passageway 58 can extend through the upper mold 62 and into the end cap cavities 86. The auxiliary passageway 58 is shown only in FIG. 8 to provide a clear view of its location on the upper mold 62. To further clarify the location of the auxiliary passageway 58, the fluid passageways 68 have been removed from FIG. 8 only. The auxiliary passageway 58 can operate to help fill the end cap cavities 86 with a supplemental material if a sufficient volume of the outer sheath 24 material is not displaced from the pre-formed cable sheath 24 to fill the end cap cavities 86. The auxiliary passageway 58 can also be used to remove surplus material if an excess amount of the outer sheath 24 material is displaced into the end cap cavities 86.

With reference to FIG. 4, a sensor package 44 is then positioned between the vertical walls 40 of the end caps 38, thereby capturing the sensor package 44 therebetween. The sensor package 44 includes spring-loaded pogo pins coupling with the exposed power and signal wires 20, 22 through the apertures 34 in the recessed portion 28. A two-part outer housing 46 (FIG. 1) is then disposed about the sensor package 44, thereby creating the sensor cable assembly 50. The two-part outer housing 46 is coupled together about the sensor package 44 using fasteners 48, such as threaded screws. The housing 46 is coupled between and to end caps 38 providing improved coupling of the sensor package 44 to the cable 26. The inner space between the sensor package 44 and the two-part outer housing 46 can be filled with a foam or gel (not shown) to protect the sensor package 44 from vibrations, impact, and environmental contaminates such as moisture. Additional details regarding an exemplary moisture sensor package are discussed in U.S. patent application Ser. No. 13/569,814 entitled "Grain Bin Capacitive Moisture Sensor System" filed by Mr. Bloemendaal and commonly assigned to CTB, Inc. and now U.S. Pat. No. 9,683,955, and which is hereby incorporated herein in its entirety.

The foregoing description of the embodiments has been provided for purposes of illustration and description. It is not intended to be exhaustive or to limit the disclosure. Individual elements or features of a particular embodiment are generally not limited to that particular embodiment. Any element(s) or feature(s) from one embodiment can be combined or interchanged with element(s) or feature(s) of any other embodiment, and even if any such combination or interchangeability is not specifically shown or described in the specification, all such possible combinations are included within this disclosure. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein (including the claims), the singular forms "a," "an," and "the" is intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "connected to," or "coupled to" another element or layer, it may be directly on, connected or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A grain bin sensor cable forming apparatus comprising:
   a plurality of mold members defining a mold cavity, the mold cavity comprising an elongated cavity designed to accept a pre-formed length of cable and an end cap cavity; the plurality of mold members having a heating position and a cooling position relative to each other;

a heater coupled to one of the mold members to heat the one of the mold members;

a thermostat coupled to the heater to control heating of the one of the mold members;

wherein the one of the mold members is designed to heat a plastic material of an outer sheath of the pre-formed length of cable when in the heated position, and wherein the mold members are designed to displace a volume of the plastic material of the outer sheath into the end cap cavity as the mold members move from the heating position into the cooling position.

2. The grain bin sensor cable forming apparatus of claim 1, wherein the pre-formed length of cable comprises a pair of wires encased within the outer sheath, and wherein the mold members are designed to create a depression in the outer sheath to expose a portion of each of the pair of wires as the mold members move from the heating position into the cooling position.

3. The grain bin sensor cable forming apparatus of claim 1, wherein the pre-formed length of cable comprises a pair of wires encased within the outer sheath, and wherein the mold members further comprises at least one pin member aligned with and designed to contact each of the pair of wires when the mold cavity is in the cooling position.

4. The grain bin sensor cable forming apparatus of claim 3, wherein the at least one pin member is spring biased.

5. The grain bin sensor cable forming apparatus of claim 1, wherein the pre-formed length of cable comprises a pair of power wires and a pair of sensor wires, wherein the one of the mold members further comprises a plurality of pin members aligned with and designed to contact each of the pairs of wires when the mold cavity is in the cooling position.

6. The grain bin sensor cable forming apparatus of claim 5, wherein the at least one pin member is spring biased.

7. The grain bin sensor cable forming apparatus of claim 1, wherein the end cap cavity comprises two end cap cavities, and wherein the mold members are designed to displace a volume of the plastic material of the outer sheath into the two end cap cavities as the mold members move from the heating position into the cooling position.

8. The grain bin sensor cable forming apparatus of claim 1, wherein the mold members comprise a passage designed to provide supplemental plastic material into the mold cavity to supplement the displaced volume in filling the end cap cavity.

9. The grain bin sensor cable forming apparatus of claim 1, wherein the mold members are designed to reduce an overall thickness of a length of the outer sheath as the mold members move from the heating position into the cooling position.

10. A grain bin sensor cable forming apparatus comprising:

a plurality of mold members defining a mold cavity, the mold cavity comprising an elongated cavity designed to accept a pre-formed length of cable and two end cap cavities; the plurality of mold members having a heating position and a cooling position relative to each other;

a heater coupled to one of the mold members to heat the one of the mold members;

a thermostat coupled to the heater to control heating of the one of the mold members;

wherein the one of the mold members is designed to heat a plastic material of an outer sheath of the pre-formed length of cable when in the heated position, and wherein the mold members are designed to displace a volume of the plastic material of the outer sheath into the two end cap cavities by reducing an overall thickness of a length of the outer sheath as the mold members move from the heating position into the cooling position.

11. The grain bin sensor cable forming apparatus of claim 1, wherein the pre-formed length of cable comprises a pair of wires encased within the outer sheath, and wherein the mold members are designed to create a depression in the outer sheath to expose a portion of each of the pair of wires as the mold members move from the heating position into the cooling position.

12. The grain bin sensor cable forming apparatus of claim 10, wherein the pre-formed length of cable comprises a pair of wires encased within the outer sheath, and wherein the mold members further comprises at least one pin member aligned with and designed to contact each of the pair of wires when the mold cavity is in the cooling position.

13. The grain bin sensor cable forming apparatus of claim 12, wherein the at least one pin member is spring biased.

14. The grain bin sensor cable forming apparatus of claim 10, wherein the pre-formed length of cable comprises a pair of power wires and a pair of sensor wires, wherein the one of the mold members further comprises a plurality of pin members aligned with and designed to contact each of the pairs of wires when the mold cavity is in the cooling position.

15. The grain bin sensor cable forming apparatus of claim 14, wherein the at least one pin member is spring biased.

16. The grain bin sensor cable forming apparatus of claim 10, wherein the mold members comprise a passage designed to provide supplemental plastic material into the mold cavity to supplement the displaced volume in filling the end cap cavity.

* * * * *

UNITED STATES PATENT AND TRADEMARK OFFICE
CERTIFICATE OF CORRECTION

| | | |
|---|---|---|
| PATENT NO. | : 9,889,583 B2 | |
| APPLICATION NO. | : 14/990486 | |
| DATED | : February 13, 2018 | |
| INVENTOR(S) | : Brent J. Bloemendaal | |

It is certified that error appears in the above-identified patent and that said Letters Patent is hereby corrected as shown below:

In the Specification

| Column 4, | Line 54 | Delete "82." and insert --82,-- therefor |
|---|---|---|
| Column 5, | Line 12 | Delete "signal" and insert --sensor-- therefor |
| Column 5, | Lines 18-19 | Delete "98, 100." and insert --22.-- therefor |

In the Claims

| Column 6, Claim 1 | Line 66 | Delete "cavity;" and insert --cavity,-- therefor |
|---|---|---|
| Column 8, Claim 10 | Line 6 | Delete "cavities;" and insert --cavities,-- therefor |

Signed and Sealed this
Fifth Day of June, 2018

Andrei Iancu
*Director of the United States Patent and Trademark Office*